United States Patent
Mizutani

(10) Patent No.: US 7,957,628 B2
(45) Date of Patent: Jun. 7, 2011

(54) PLAYBACK APPARATUS AND METHOD OF CONTROLLING A PLAYBACK APPARATUS

(75) Inventor: Fumitoshi Mizutani, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/694,130

(22) Filed: Jan. 26, 2010

(65) Prior Publication Data

US 2010/0189418 A1 Jul. 29, 2010

(30) Foreign Application Priority Data

Jan. 27, 2009 (JP) ................................ 2009-015702

(51) Int. Cl.
*H04N 5/917* (2006.01)
(52) U.S. Cl. .................... 386/356; 386/355; 386/357
(58) Field of Classification Search .............. 386/200, 386/216, 219, 235, 248, 353–356
See application file for complete search history.

(56) References Cited

U.S. PATENT DOCUMENTS

| | | | |
|---|---|---|---|
| 7,420,496 B2 * | 9/2008 | Kim et al. ................ | 341/145 |
| 2007/0223887 A1 * | 9/2007 | Kanamori et al. ......... | 386/112 |
| 2008/0205791 A1 * | 8/2008 | Ideses et al. ............. | 382/285 |
| 2009/0046995 A1 * | 2/2009 | Kanumuri et al. ......... | 386/114 |
| 2009/0232213 A1 * | 9/2009 | Jia .......................... | 375/240.16 |
| 2010/0002071 A1 * | 1/2010 | Ahiska .................... | 348/36 |

FOREIGN PATENT DOCUMENTS

| | | |
|---|---|---|
| JP | 2008-042683 A | 2/2008 |
| JP | 2008-067316 A | 3/2008 |
| JP | 2008-252701 A | 10/2008 |
| JP | 2010-045593 A | 2/2010 |

OTHER PUBLICATIONS

U.S. Appl. 12/540,311, filed Aug. 12, 2009, Terunuma.
Akira Kumagai et al., "Super-Resolution Technology for Video Quality Enhancement," Toshiba Review, Toshiba Inc., vol. 63, No. 11, pp. 50-53, Nov. 1, 2008.
Information Sheet for preparing an Information Disclosure Statement.
Hiwada et al., "SpursEngineSE1000 High-Performance Stream Processor," Special Reports, Toshiba Review, vol. 63, No. 7, 2008, pp. 17-21.
Notice of Reasons for Rejection mailed by Japan Patent Office on Apr. 13, 2010 in the corresponding Japanese patent application No. 2009-015702.

* cited by examiner

*Primary Examiner* — Jamie Atala
(74) *Attorney, Agent, or Firm* — Knobbe, Martens, Olson & Bear LLP

(57) ABSTRACT

According to one embodiment, a playback apparatus includes a multimedia processor configured to allocate a first stream buffer area in a first memory for storing a encoded video data, and includes a decoder configured to decode the encoded video data, a main processor configured to execute a decoding program application for decoding the encoded video data, and to execute a switching program application configured to switch a destination where the decoding is executed between the multimedia processor and the decoding program application such that a picture group which is a unit for managing the encoded video data is not separately supplied to two destinations, in response to a switching request, wherein the decoding program application is configured to allocate a second stream buffer area in a second memory for storing the encoded video data and a decoding buffer area in the second memory for storing data related to decoding.

10 Claims, 8 Drawing Sheets

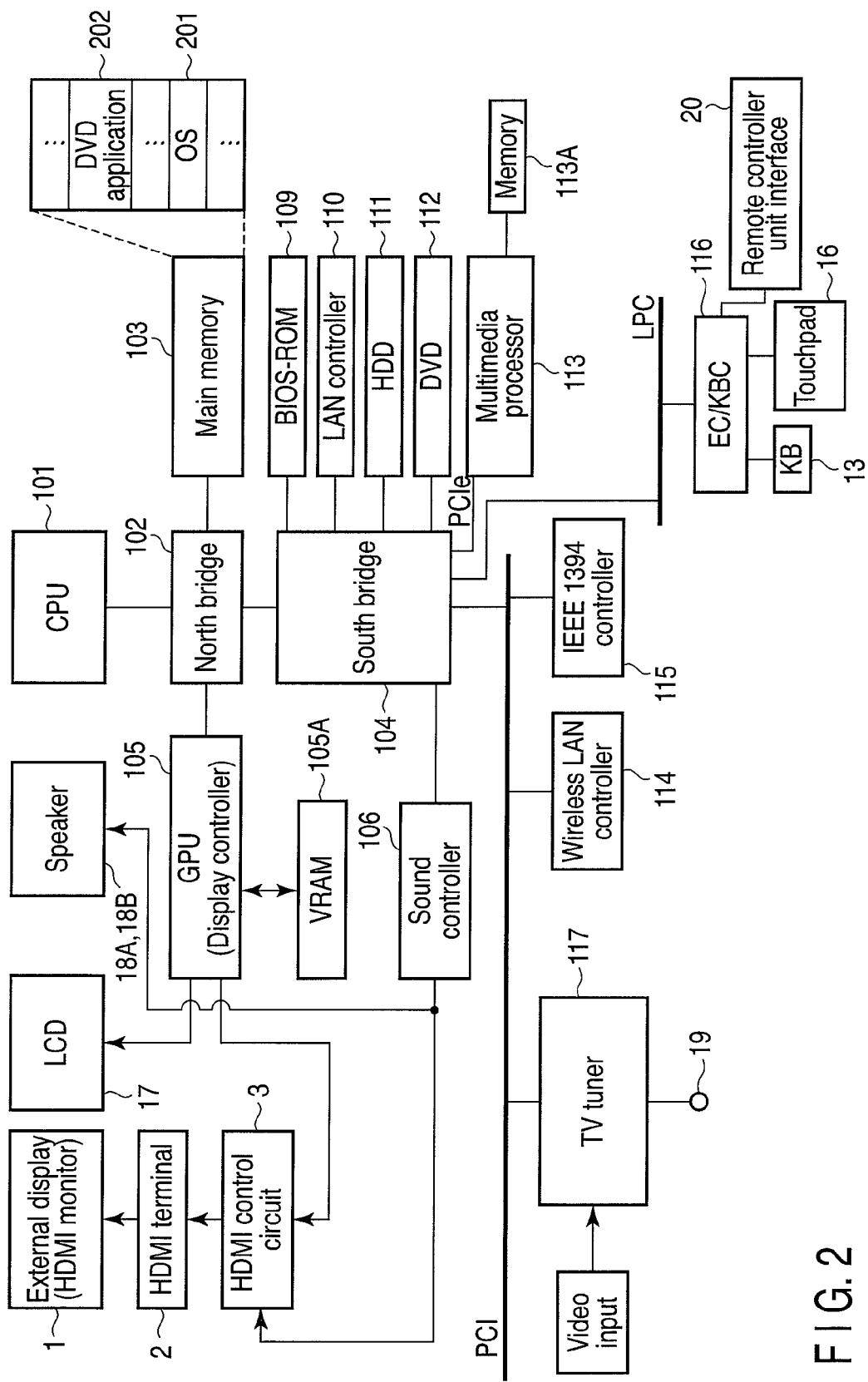
F I G. 2

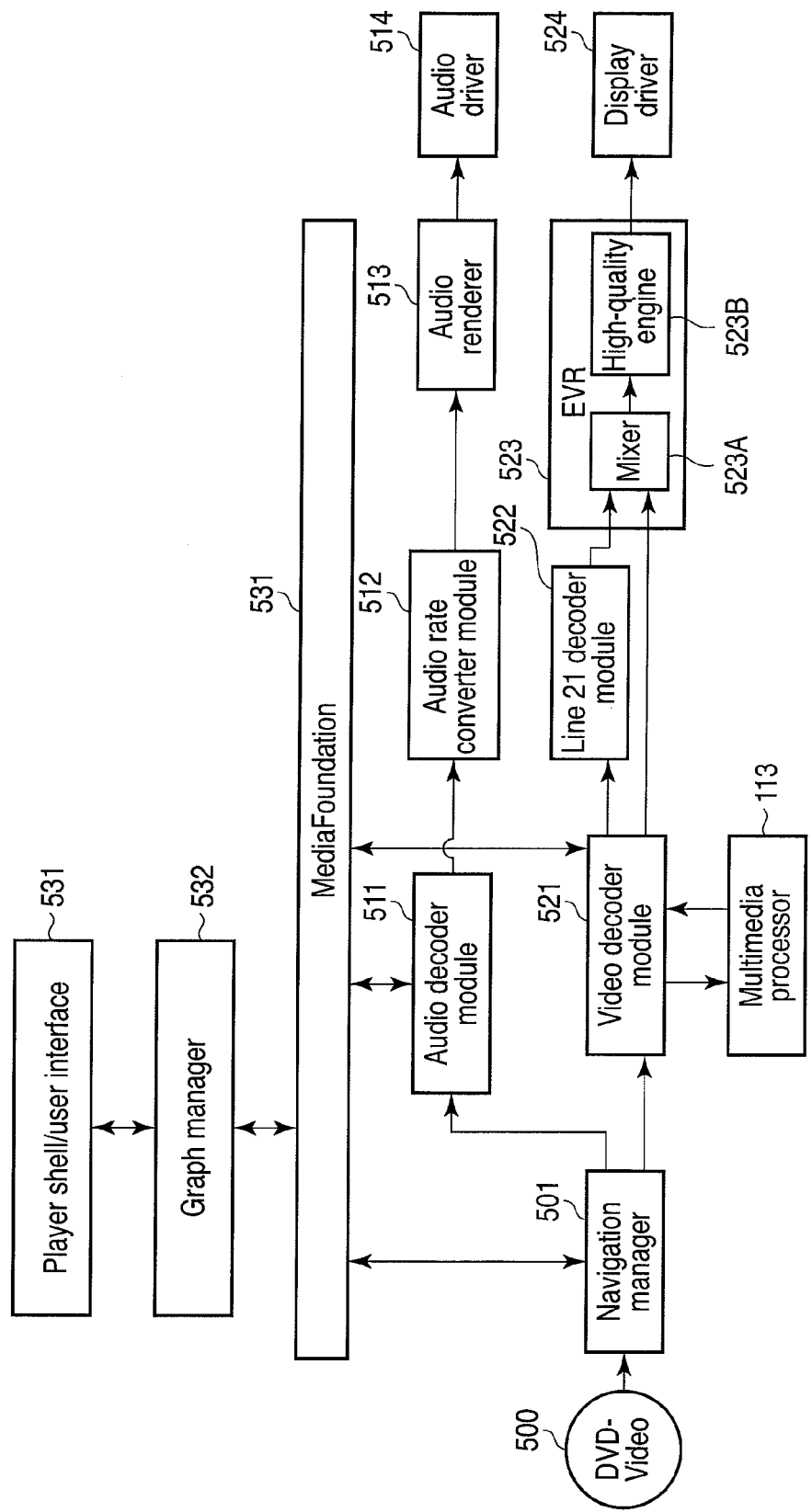
F I G. 7

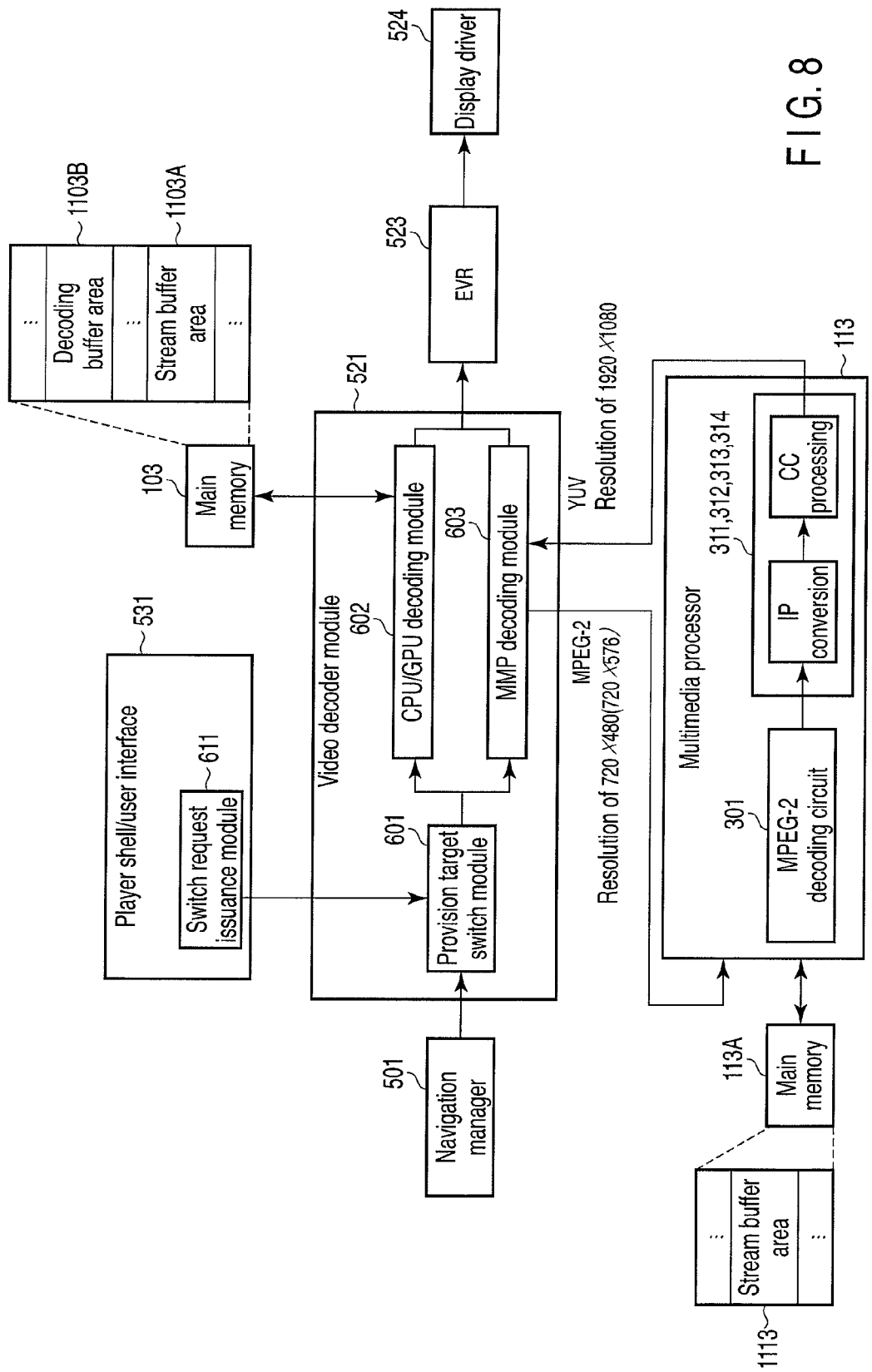
F I G. 8

PLAYBACK APPARATUS AND METHOD OF CONTROLLING A PLAYBACK APPARATUS

CROSS-REFERENCE TO RELATED APPLICATIONS

This application is based upon and claims the benefit of priority from Japanese Patent Application No. 2009-015702, filed Jan. 27, 2009, the entire contents of which are incorporated herein by reference.

BACKGROUND

1. Field

One embodiment of the invention relates to a playback apparatus, which can switch execution/non-execution of super-resolution conversion, and to a method of controlling a playback apparatus.

2. Description of the Related Art

Recently, a high-definition (HD) television with a full specification featuring a resolution of 1920×1080 pixels has come into wide use. However, the availability of full HD specification content is limited. For this reason, high pixel conversion is performed with respect to conventional DVD content having Secure Digital (SD) quality. In this way, the user sees a television broadcast using the full HD specification television.

The following document discloses a notebook personal computer, which converts using a super-resolution technique as high-pixel conversion.

Document: "Akira KUMAGAI et al., "Super-resolution Technique Realizing High-quality Video", Toshiba Review, Toshiba Inc., Nov. 1, 2008, Vol. 63, No. 11, pp. 50-53"

Some methods are given as the method of high-pixel conversion. For example, there exist a bi-cubic (convolution) method and a bi-linear (interpolation) method. According to a bi-cubic method using a super-resolution technique, the load on a processor is higher than the bi-linear method.

At present, it is difficult to execute the bi-cubic method in real time using a personal computer. Considering the foregoing circumstances, the following proposal has been made. According to the proposal, a high-speed processor executes super-resolution conversion using a bi-cubic method independently from a processor executing an operating system and applications.

For example, an independent high-speed processor is connected to a bridge circuit via a serial bus conforming to the PCI Express standard. According to the PCI Express standard, a bidirectional communication is performed. In the PCI Express standard, a unidirectional effective data transmission rate is about 250 MB/s. On the other hand, a transmission rate required for transmitting full HD quality video data is about 187 MB/s. Therefore, there is not so time to transmit the full HD quality video data according to the PCI Express standard. For this reason, preferably, data supplied to the independent processor is reduced as much as possible.

Whether the user likes an image after super-resolution conversion greatly depends on his taste. For this reason, the user has demands for dynamically changing execution/non-execution of super-resolution while playback a moving image.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary block diagram showing the system configuration of the personal computer shown in FIG. 1;

FIG. 7 is an exemplary block diagram showing the configuration of a DVD application executed by a CPU;

FIG. 8 is an exemplary block diagram to explain the configuration of a module for executing a switch of up-convert/non- up-convert according to one embodiment of the present invention;

DETAILED DESCRIPTION

Figure 1:
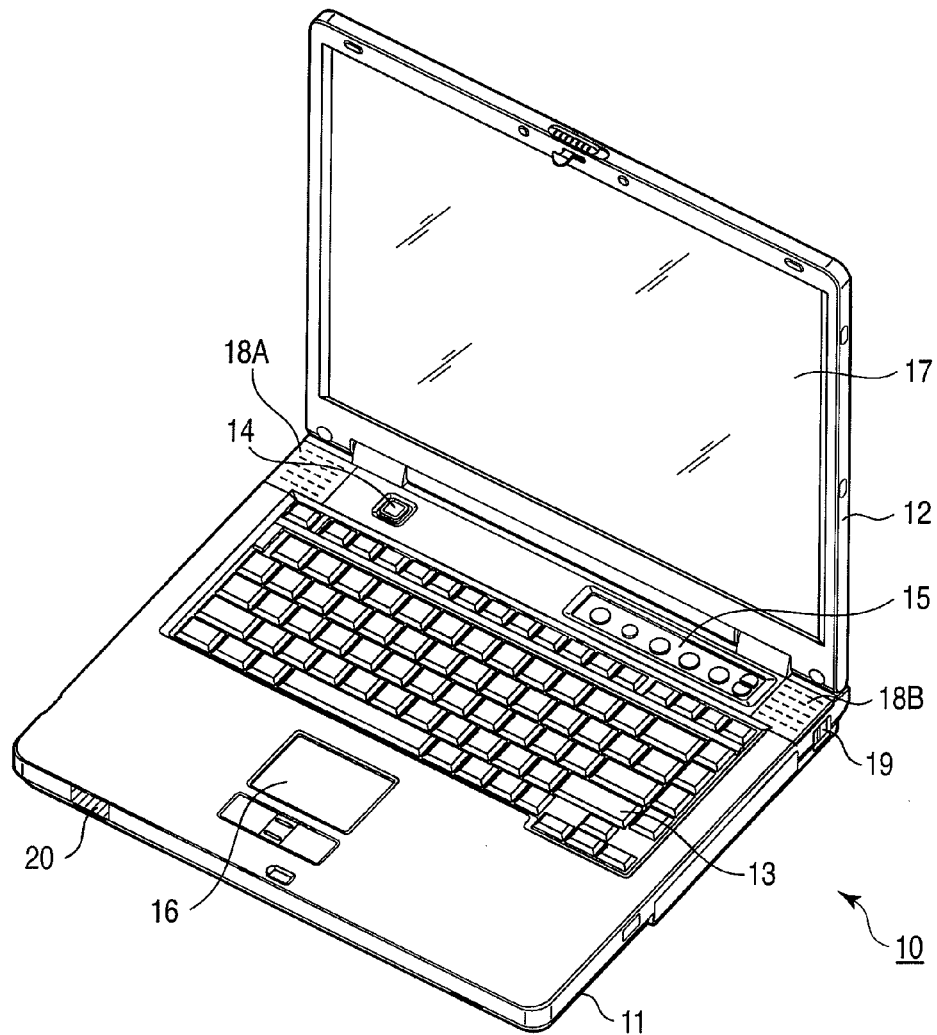
FIG. 1 is an exemplary perspective view showing a notebook type personal computer given as a playback apparatus according to one embodiment of the present invention.
Figure 3:
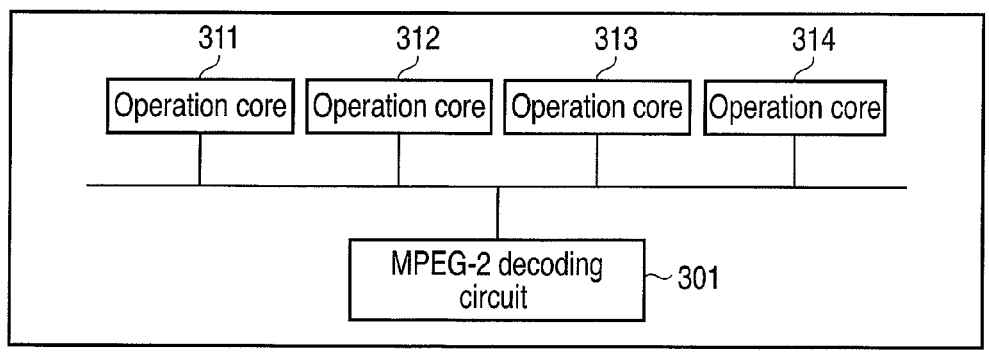
FIG. 3 is an exemplary block diagram showing the system configuration of a multimedia processor shown in FIG. 2.

Various embodiments according to the invention will be described hereinafter with reference to the accompanying drawings. In general, according to one embodiment of the invention, a playback apparatus comprises a first memory, a multimedia processor configured to allocate a first stream buffer area in the first memory for storing a encoded video data, and comprising a decoding circuit configured to decode the encoded video data and an arithmetic module configured to execute super-resolution conversion to increase a resolution of the decoded video data, an issuing module configured to issue a switching request to switch between execution and non-execution of the super-resolution conversion, a second memory, and a main processor configured to execute a decoding program application for decoding the encoded video data, and to execute a switching program application configured to switch a destination where the decoding is executed between the multimedia processor and the decoding program application such that a picture group which is a unit for managing the encoded video data is not separately supplied to two destinations, in response to the switching request issued from the issuing module, wherein the decoding program application is configured to allocate a second stream buffer area in the second memory for storing the encoded video data and a decoding buffer area in the second memory for storing data related to decoding, and wherein the switching program application is configured to switch the destination from the multimedia processor to the decoding program application in a state that the encoded video data is not stored in the first stream buffer area of the first memory, and to switch the destination from the decoding program application to the multimedia processor in a state that the encoded video data is not stored in the second stream buffer area and the data related to decoding is not stored in the decoding buffer area.

One embodiment of the present invention will be hereinafter described with reference to the accompanying drawings.

The configuration of a playback apparatus according to one embodiment of the present invention will be described below with reference to FIGS. 1 and 2. For example, the playback apparatus of this embodiment is realized from a notebook-type mobile personal computer 10 functioning as an information processing apparatus.

The personal computer 10 can record and playback video content data (audiovisual content data) such as broadcast program data and video data input from external devices. In other words, the personal computer 10 has a television (TV) function for viewing and recording broadcast program data broadcast according to a television broadcast signal. For example, the foregoing TV function is realized by a TV application program previously installed in the personal computer 10. Further, the TV function has the following functions. One is a function of recording video data input from external AV devices. The other is a function of playback recorded video data and recorded broadcast program data.

FIG. 1 is a perspective view showing a state that a display unit of the computer 10 is opened. The computer 10 is composed of a computer body 11 and a display unit 12. The display unit 12 has a built-in display device comprising a thin film transistor liquid crystal display (TFT-LCD) 17. The LCD has a full HD specification with a resolution of 1920×1080 pixels.

The display unit 12 is attached to the computer body 11 so that it is freely rotatable between the following opened and closed positions. One is an opened position of exposing the upper surface of the computer body 11. The other is a closed position of covering the upper surface of the computer body 11. The computer body 11 has a thin box shape. The upper surface of the computer body 11 is provided with a keyboard 13, a power button 14 for turning on/off the power of the computer 10. Further, the upper surface is provided with an input operation panel 15, a touchpad 16, speakers 18A and 18B.

The input operation panel 15 is an input device, which inputs the event corresponding to the pushed button. The input operation panel 15 includes a plurality of buttons for starting each of several functions. The foregoing button group includes an operation button for controlling a TV function (viewing, recording, playback recorded broadcast program data/video data). The front side of the computer body 11 is provided with a remote controller unit interface 20. The remote controller unit interface 20 performs a communication with a remote controller unit for remote-controlling the TV function of the computer 10. The remote controller unit interface 20 comprises an infrared signal receiver.

For example, the right side of the computer body 11 is provided with a TV broadcast antenna terminal 19. Further, the back side of the computer body 11 is provided with an external display connection terminal conforming to the High-Definition Multimedia Interface (HDMI) standard. The external display connection terminal is used for outputting video data (moving image data) included in video content data such as broadcast program data to an external display.

Referring now to FIG. 2, the system configuration of the computer 10 will be described below.

As shown in FIG. 2, the computer 10 includes a CPU (main processor) 101, a north bridge 102, a main memory 103, a south bridge 104 and a graphics processing unit (GPU) (sub-processor) 105. Further, the computer 10 includes a video memory (VRAM) 105A, a sound controller 106, a BIOS-ROM 109, a LAN controller 110, a hard disk drive (HDD) 111, a DVD drive 112 and a multimedia processor 113. Furthermore, the computer 10 includes a memory 113A, a wireless LAN controller 114, an IEEE 1394 controller 115, an embedded controller/keyboard controller IC (EC/KBC) 116 and a TV tuner 117.

The CPU 101 is a processor for controlling the operation of the computer 10. The CPU 101 executes an operating system (OS) 201 loaded from the hard disk drive (HDD) 111 into the main memory 103 and various application programs such as a DVD application program 202. The DVD application program 202 is software for playing back a DVD loaded in the DVD drive 112. Further, the CPU 101 executes a basic input/output system (BIOS) stored in the BIOS-ROM 109. The BIOS is a program for controlling hardware.

The north bridge 102 is a bridge device, which performs a connection between a local bus of the CPU 101 and the south bridge 104. The north bridge 102 has a built-in memory controller for controlling an access to the main memory 103. Further, the north bridge 102 has a function of performing a communication with the GPU 105 via a serial bus conforming to the PCI Express standard.

The GPU 105 is a display controller, which controls a LCD 17 used as a display monitor of the computer 10. A display signal generated by the GPU 105 is supplied to the LCD 17. Moreover, the GPU 105 can transmit a digital video signal to an external display device 1 via an HDMI control circuit 3 and an HDMI terminal 2.

The HDMI terminal 2 is a connection terminal of the foregoing external display. The HDMI terminal 2 can transmit a non-compressed digital video signal and a digital audio signal to the external display device 1 such as a television via a single cable. The HDMI control circuit 3 is an interface for transmitting a digital video signal to an external display device 1 called as an HDMI monitor via the HDMI terminal 2.

The south bridge 104 controls various devices on a Low Pin Count (LPC) bus and various devices on a Peripheral Component Interconnect (PCI) bus. Further, the south bridge 104 has a built-in Integrated Drive Electronics (IDE) controller for controlling the hard disk drive (HDD) 111 and the DVD drive 112. Furthermore, the south bridge 104 has a function of performing a communication with the sound controller 106.

The south bridge 104 is connected with a multimedia processor 113 via a serial bus conforming to the PCI Express (PCIe) standard.

The memory 113A is used as a work memory for the multimedia processor 113. The multimedia processor 113 is configured in such a manner that an MPEG-2 decoding circuit 301 and four operation cores 311 to 314 are carried on one chip. In this case, the MPEG-2 decoding circuit 301 is provided in order to decode compressed and coded video data. Each of the operation cores 311 to 314 has high media processing performance and high power consumption against performance. When the DVD application program 202 plays back a DVD, the MPEG-2 decoding circuit 301 decodes video data of the DVD. Four operation cores 311 to 314 execute interlace progressive conversion (IP conversion) with respect to video data having a resolution of 720×480 pixels, decoded by the decoding circuit 301. The foregoing four operation cores 311 to 314 execute super-resolution conversion. According to the super-resolution conversion, SD-quality video data having a resolution of 720×480 pixels is converted to HD-quality video data having a resolution of 1920×1080 pixels. A bi-cubic method (cubic convolutional interpolation [CC] method) is used for the super-resolution conversion by the multimedia processor 113. A large number of operations are required in order to execute super-resolution conversion using the bi-cubic method. According to this embodiment, operation cores 311 to 314 of the multimedia processor 113, which is a special processor different from the CPU 101, are used as a backend processor. In this way, super-resolution conversion is executed by the multimedia processor 113. Therefore, it is possible to execute super-resolution conversion without increasing the load on the CPU 101.

The DVD application program 202 has a decoding module executed by the CPU 101 to decode video data. When decoding is executed using the decoding module of the DVD application program 202, video data decoded for displaying video data on the LCD 17 is converted as follows. Specifically, SD-quality video data having a resolution of 720×480 pixels is converted to HD-quality video data having a resolution of 1920×1080 pixels using a high-pixel conversion function of the GPU 105. According to the high-pixel conversion function of the GPU 105, processing is reduced (the amount of calculation is small) compared with the bi-cubic method (cubic convolutional interpolation [CC] method). However, high-pixel conversion is performed according to a bi-linear method of degraded image quality.

In this case, the GPU 105 performs high-pixel conversion using the bi-linear method; however, this results from the following case. Namely, the resolution of video data input to the GPU 105 is different from the resolution to be output from the LCD 17 and the HDMI terminal 2. If the resolution to be output is the same as the resolution input to the GPU 105, the GPU 105 does not execute the foregoing high-pixel conversion.

The user can select how to execute decoding and high-pixel conversion. Specifically, decoding and high-pixel conversion are performed using the multimedia processor 113. Or, decoding and high-pixel conversion are performed by combining the DVD application program 202 and the GPU 105. In the following description, the case of executing decoding and high-pixel conversion by the multimedia processor 113 is called an up-convert by the multimedia processor 113.

The sound controller 106 is a sound source device. The sound controller 106 outputs a playback target audio data to speakers 18A and 18B or the HDMI control circuit 3.

The wireless LAN controller 114 is a wireless communication device, which performs a wireless communication conforming to the IEEE 802.11 standard, for example. The IEEE 1394 controller 115 performs a communication with external apparatuses via a serial bus conforming to the IEEE 1394 standard.

The embedded controller/keyboard controller IC (EC/KBC) 116 is a one-chip microcomputer configured in the following manner. Specifically, an embedded controller for power management, a keyboard controller for controlling a keyboard (KB) 13 and a touchpad 16 are integrated on one chip. The embedded controller/keyboard controller IC (EC/KBC) 116 has a function of turning on/off the power of the computer in accordance with the operation of the power button 14 by the user. Further, the embedded controller/keyboard controller IC (EC/KBC) 116 has a function of performing a communication with the remote controller unit interface 20.

The TV tuner 117 is a receiver, which receives broadcast program data broadcast by a television (TV) broadcast signal. The TV tuner 117 is connected to an antenna terminal 19. For example, the TV tuner 117 is realized as a digital TV tuner, which is capable of receiving digital broadcast program data such as digital terrestrial TV broadcasting. Further, the TV tuner 117 has a function of capturing video data input from external devices.

The data structure defined in the DVD video system and its management information will be described below.

Figure 4:
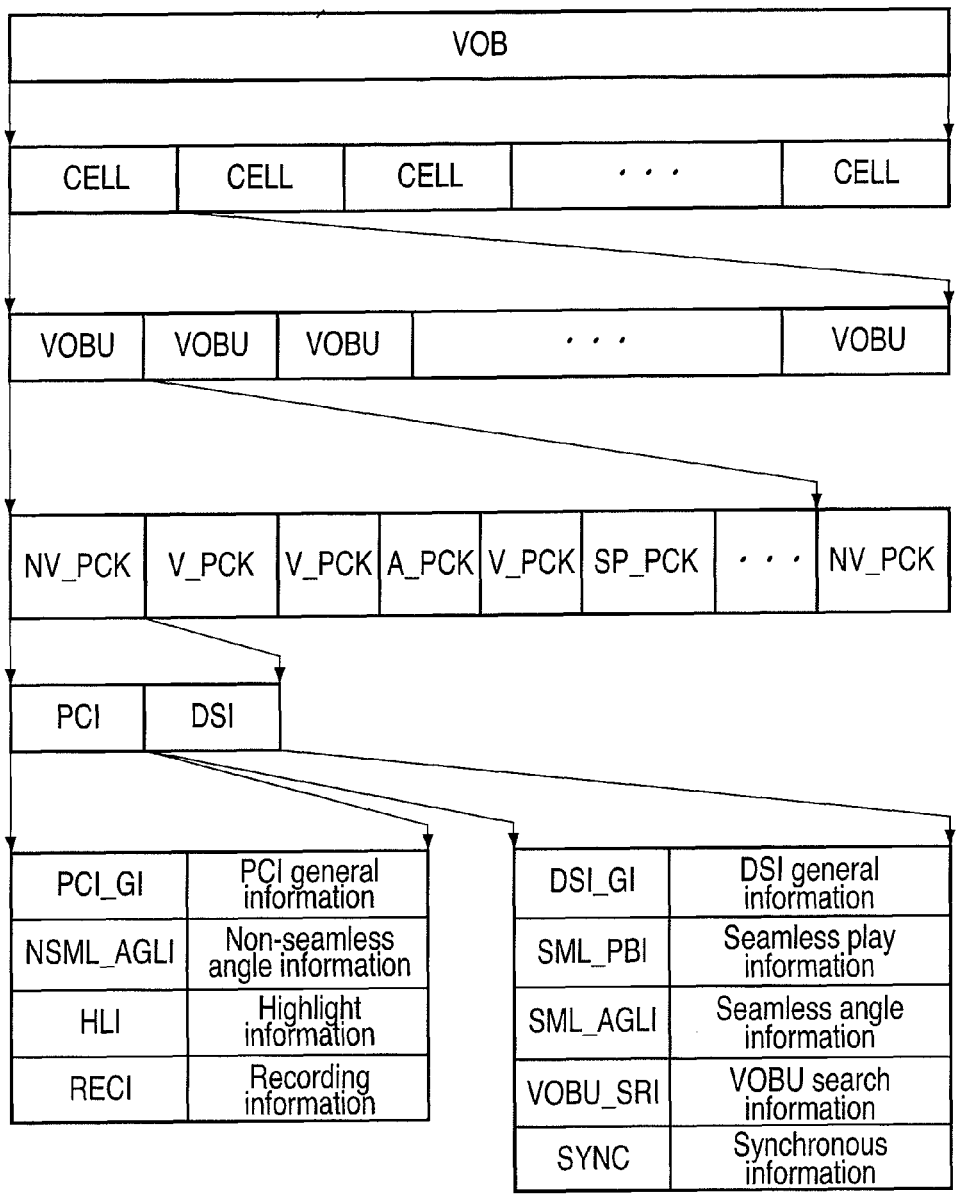
FIG. 4 is an exemplary view to explain the video object hierarchy structure of a DVD video system and the data contents of a navigation pack.

FIG. 4 shows the hierarchy structure of a video object (VOB). The VOB is equivalent to one title, and also, called as a video title set. For example, this is equivalent to recording of one title of a movie. The video object is managed in a state of being divided into a plurality of cells to manage the playback. In this case, one cell is set to include a plurality of video object units (VOBU). The VOBU is a time unit from 0.4 to 1.0 seconds in video playback time. One VOBU is composed of a navigation pack (NV_PCK), a plurality of video packs (V_PCK), a plurality of audio packs (A_PCK) and a plurality of sub-picture packs (SP_PCK).

One navigation pack NV_PCK is arranged to be position on the header of one VOBU. The navigation pack NV_PCK is control data, which is made a reference when data of the belonging VOBU is played back. The navigation pack NV_PCK is composed of data search information (DSI) and a picture control information (PCI).

The foregoing PCI shows start presentation time and end presentation time of the VOBU. The PCI shows non-seamless angle information, and has a VOBU address to be played back next to each angle when a played back video stream (angle) is switched. Further, the PCI has highlight information, and includes start presentation time of the highlight information, end presentation time thereof, button display position information.

The foregoing DSI has a system clock of NV_PCK including DSI as general information, a VOBU end address and a VOBU reference (I) picture end address. The DSI has a VOBU category, an interleave unit (i.e., unit segmented as a multi-angle switch unit) end address, size and start address of the next interleave unit to be jumped, video start and end addresses of the VOB, as seamless playback information (SML_PBI). Further, in the DSI, the next interleave unit address and size are prepared by the number of angles, as seamless angle information (SML_AGLI). In the DSI, VOBU search information (VOBU_SRI) is prepared as information used for the case of executing special playback such as frame forward and frame backward. The header address of several VOBUs before and after this VOBU is described. In the DSI, audio and sub-picture address to be synchronized at the corresponding VOBU position are described as synchronous information (SYNC).

Figure 5:
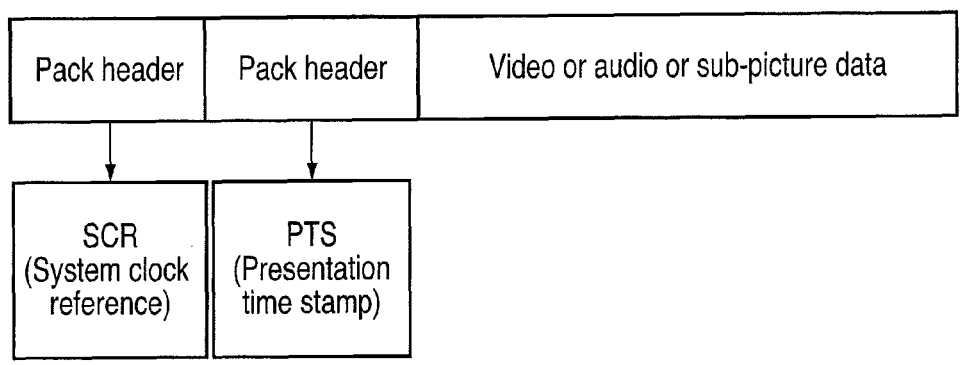
FIG. 5 is an exemplary view to explain the configuration of video, audio and sub-video pack.

FIG. 5 shows the pack configuration of a video pack, an audio pack and a sub-picture pack. A pack is provided with a pack header. A system clock reference (SCR) is described in the foregoing pack header. The SCR is described in a VOBU including an I picture. The SCR resets a system clock generator included in a playback apparatus, and is used to set a reference time. Further, the packet header is added following a pack header. A presentation time stamp (PTS) is described in the foregoing packet header. The foregoing PTS is necessarily described in a VOBU including an I picture. In the pack configuration, video data or audio data or sub-picture data exist following the packet header. One pack length is defined as 2048 bytes.

As described above, the presentation time stamp (PTS) is described in each pack. Reproduction is performed in cooperation with the PTS and time information obtained from the system clock of the playback apparatus. In this way, playback of video, audio and sub-picture is synchronized.

The video object unit (VOBU) includes group of pictures (GOP) so that they are not divided. The group of pictures (GOP) is composed of an I picture and a B picture. The continuous data is divided into a video pack. The foregoing GOP is a video data management minimum unit in MPEG-2.

Reproduction is executed at the GOP unit; for this reason, if a part of the GOP is lack, a decoder cannot correctly decode the GOP.

According to the DVD video specification, a sequence header must be added before all GOP. The sequence header includes information on a video stream such as an aspect ratio, a bit rate, a picture resolution and a frame rate.

The present apparatus uses a different decoder in up-convert and non- up-convert. Therefore, in order to make a switch of up-convert/non- up-convert, the decoder must be switched so that the GOP is divided. Therefore, correction, that is, the decoder must be switched at the segment of neighboring GOP. For this reason, if the user operates a switch of up-convert/non- up-convert, the present apparatus detects the sequence header, and then, switches the decoder at the segment of neighboring GOP.

Figure 6:
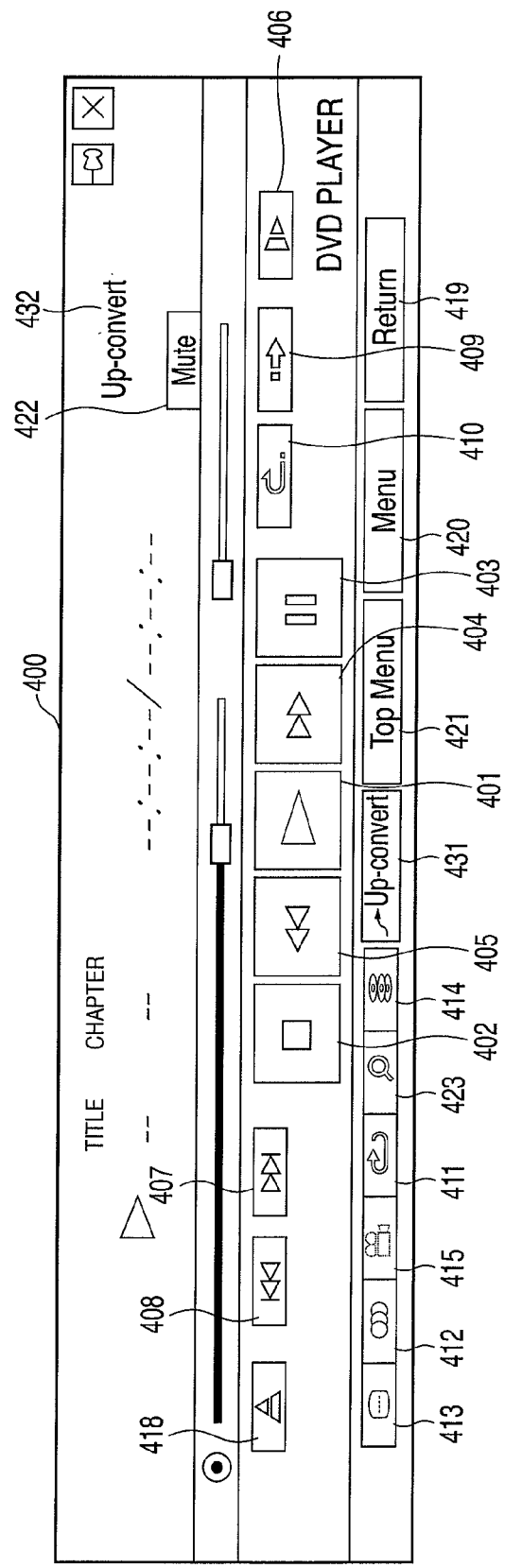
FIG. 6 is an exemplary view showing a playback control panel displayed on a LCD to operate a switch of up-convert/non- up-convert.

FIG. 6 shows a playback control panel 400 displayed on the LCD 17 when the user operates a switch of up-convert/non-up-convert. The playback control panel 400 has a play button 401, a stop button 402, a pause button 403, a fast forward button 404, a fast re-window button 405 and a forward slow playback button 406. Further, the panel 400 has a next chapter button 407, a pre-chapter button 408, a one-touch replay button 409, a one-touch skip button 410, a repeat button 411, a sound switch button 412 and a title switch button 413. Furthermore, the panel 400 has a drive/folder designation button 414, an angle switch button 415, an eject button 418, a return button 419, a menu button 420, a top menu button 421, a mute button 422 and a chapter/title search button 423. In addition, the playback control panel 400 has an up-convert switch button 431 and an up-convert state indication area 432.

The play button 401 is provided so that the user gives instructions to play back the content to the DVD application program 202. The stop button 402 is provided so that the user gives instructions to stop playback to the DVD application program 202. The pause button 403 is provided so that the user gives instructions to temporarily stop playback to the DVD application program 202. The fast forward button 404 is provided so that the user gives instructions to perform fast forward playback to the DVD application program 202. The fast re-window button 405 is provided so that the user gives instructions to perform fast backward playback to the DVD application program 202. The forward slow playback button 406 is provided so that the user gives instructions to perform forward slow playback to the DVD application program 202. The next chapter button 407 is provided so that the user gives instructions to perform playback from the header of the next chapter to the DVD application program 202. The pre-chapter button 408 is provided so that the user gives instructions to perform playback from the header of the pre-chapter to the DVD application program 202. The one-touch replay button 409 is provided so that the user gives instructions to perform playback before about 10 seconds from the present playback position to the DVD application program 202. The one-touch skip button 410 is provided so that the user gives instructions to perform playback after about 30 seconds from the present playback position to the DVD application program 202. The repeat button 411 is provided so that the user gives instructions to perform repeat playback and cancel of the title to the DVD application program 202. The sound switch button 412 is provided so that the user gives instructions to switch a playback language to the DVD application program 202. The title switch button 413 is provided so that the user gives instructions to switch a title language to the DVD application program 202. The drive/folder designation button 414 is provided so that the user gives instructions to designate drive/folder to the DVD application program 202. The angle switch button is provided so that the user gives instructions to switch an angle to the DVD application program 202. The eject button 418 is provided so that the user gives instructions to eject an optical disk from the DVD drive 112 to the DVD application program 202. The return button 419 is provided so that the user gives instructions to perform a return operation to the DVD application program 202. The menu button 420 is provided so that the user gives instructions to display a menu to the DVD application program 202. The top menu button 421 is provided so that the user gives instructions to display a top menu to the DVD application program 202. The mute button 422 is provided so that the user gives instructions to mute an output sound to the DVD application program 202. The chapter/title search button 423 is provided so that the user gives instructions to search a chapter or title to the DVD application program 202.

The user moves a pointer on the up-convert switch button 431, and thereafter, presses the left button of a mouse, and thereby, a switch of up-convert/non- up-convert is performed. When the present apparatus is in an up-convert state, a character "up-convert" is displayed on the up-convert state display area 432. Conversely, when the present apparatus is in a non- up-convert state, the character "up-convert" is not displayed on the up-convert state display area 432.

FIG. 7 shows the configuration of the DVD application program 202 executed by the CPU 101 of the present apparatus to perform playback. A technique called as MediaFoundation is used as the player software. The foregoing technique, that is, MediaFoundation is executed under a Windows (Registration Trademark) environment, which is an operating system (OS) provided by Microsoft Corporation in order to playback content. The MediaFoundation is an application programming interface (API) set based on a component object model (COM) for handling multimedia contents. Namely, the MediaFoundation is a set of modules having various functions. In order to play back a moving picture, a plurality of modules selected from a module library having a plurality of modules are combined to build up a graph.

The Microsoft Corporation has provided Direct Show before providing MediaFoundation. According to Direct Show, there exists a concept of stopping playback of multimedia contents. A software application using Direct Show receives a command showing stoppage issued by Direct Show, and thereby, it is possible to know that playback of multimedia contents is stopped. However, according to the MediaFoundation, there exists no concept of stopping playback of multimedia contents. A software application using MediaFoundation cannot know the stoppage of multimedia contents.

According to the MediaFoundation, a clear command is issued to a processor in order to clear the content of a cache of a work memory used by the processor, which executes decoding when content playback is stopped. Therefore, when the playback is stopped, the content of the cache of the work memory is cleared. This means that the cache area of the work memory is checked, and thereby, it is determined whether or not playback is stopped.

DVD data played back by the DVD drive 112 is supplied to a navigation manager 501. The navigation manager 501 separates the DVD data into a video pack (V_PCK), a sub-picture pack (SP_PCK) and an audio pack (A_PCK). The navigation manager 501 transfers the audio pack (A_PCK) to an audio decoder module 511. Further, the navigation manager 501 transfers the video pack (V_PCK) and the sub-picture pack (SP_PCK) to a video decoder module 521.

The audio decoder module 511 decompresses compressed sound information to convert it to non-compressed audio data, and thereafter, transfers the audio data to an audio rate converter module 512. The audio rate converter module 512 converts the audio data to a proper sampling rate, and thereafter, transfers it to an audio renderer 513. The audio renderer 513 synthesizes the transferred audio data and audio data generated by other software running on the computer, and then, transfers the synthesized audio data to an audio driver 514. The audio driver 514 controls the sound controller 106 so that the audio data is output from speakers 18a and 18B.

If line 21 data is included, the video decoder module 521 transfers the line 21 data to a line 21 decoder module 522. The video decoder module 521 decompresses a video pack (V_PCK) and a sub-picture pack (SP_PCK) using an internal decoder module or the multimedia processor 113. When the multimedia processor 113 decompresses the video pack (V_PCK), interlace progressive conversion (IP conversion) and high-pixel conversion are carried out with respect to the video data decompressed by the multimedia processor. The decompressed video data is supplied to an extension video renderer (EVR) 523. A mixer 523A of the extension video renderer 523 executes mixing of video with sub-picture and displays title. Video data mixed by the mixer 523A is subjected to high-quality processing by a high-quality engine 523B. The video data subjected to high-quality processing is transferred to a display driver 524. The display driver 524 controls the GPU 105 so that a video image is displayed on the LCD 17.

A player shell/user interface 531 executes a processing related to display of the playback control panel 400. The player shell/user interface 531 gives notification of a command corresponding to a button operated by the user to MediaFoundation 531 via a graph manager 532. The MediaFoundation 531 controls the navigation manager 501, the audio decoder module 511 and the video decoder module in accordance with the given command.

The configuration for performing a switch of up-convert/ non- up-convert will be described below.

FIG. 8 is a view to explain a module for executing an up-convert/non- up-convert switch procedure according to one embodiment of the present invention.

As shown in FIG. 8, the module is composed of a player shell/user interface 531, a navigation manager 501, a video decoder module 521, a multimedia processor 113, an extension video renderer 523 and a display driver 524.

A switch request issuance module 611 of the player shell/ user interface 531 issues a switch request to the video decoder module 521 when the user operates the up-convert switch button 431.

The video decoder module 521 has a provision target switch module 601, a CPU/GPU decoding module 602 and a multimedia processor decoding module (MMP decoding module) 603. The provision target switch module 601 transfers a compressed video data supplied from the navigation manager 501 to one of the CPU/GPU decoding module 602 and the MMP decoding module 603.

When detecting a switch request issued by the switch request issuance module 611, the provision target switch module 601 starts to transfer the compressed video data transferred to one of the CPU/GPU decoding module 602 and the MMP decoding module 603 to the other of the same as above.

The CPU/GPU decoding module 602 is a software application executed by the CPU. The CPU/GPU decoding module 602 decompresses the transferred video data using a decode support function by the GPU to generate non-compressed video data, and thereafter, transfers the generated video data to the extension video renderer 523.

The CPU/GPU decoding module 602 secures a stream buffer area and a decoding buffer area in a part of the main memory 103. The stream buffer area is temporarily stored with a stream of the video data supplied from the provision target switch module 601. The CPU/GPU decoding module 602 reads the video data stream stored in the stream buffer area to decode the read data. In decoding, the module 602 stores data related to decoding in the decoding buffer area.

The MMP decoding module 603 transfers a stream of video data compressed in the MPEG-2 format to the multimedia processor 113. The multimedia processor 113 temporarily stores the transferred stream in a stream buffer area of a memory 113A. Then, the multimedia processor 113 reads the video data stream stored in the stream buffer area. Thereafter, the multimedia processor 113 decodes the read data using the MPEG-2 decoding circuit 301 to generate interlaced video data having a resolution of 720×480 or 720×576 pixels. Then, the multimedia processor 113 executes IP conversion and CC processing (up-convert using bi-cubic method) with respect to the decoded video data using operation cores 311 to 314. In this way, a video data having a resolution of 1920×1080 pixels and YUV focusing mat is generated. Then, the multimedia processor 113 returns the up-converted video data to the MMP decoding module 603. The MMP decoding module 603 transfers the returned video data to the extension video renderer 523.

Figure 9:
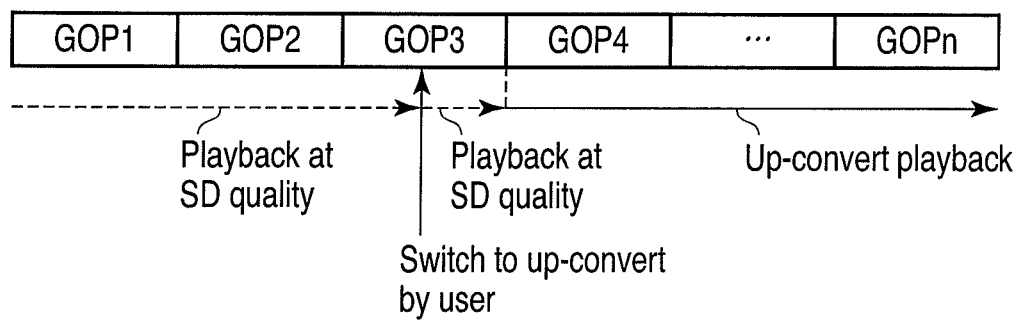
FIG. 9 is an exemplary view showing the case where the user gives up-convert instructions to play back an up-converted image from a state that an image is played back at a non- up-convert SD quality.
Figure 10:
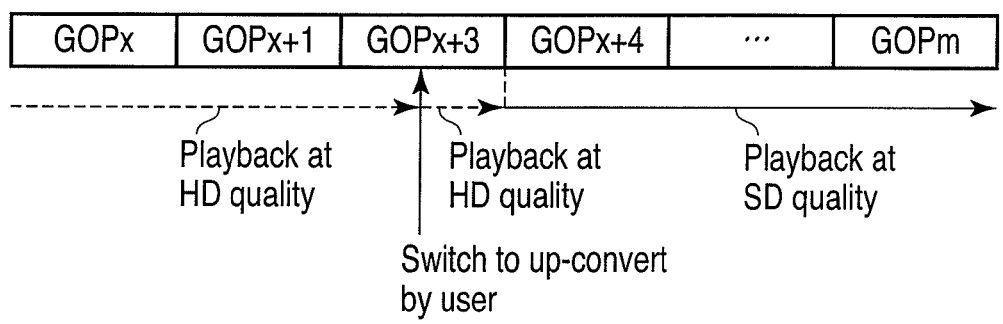
FIG. 10 is an exemplary view showing the case where the user gives non- up-convert instructions to play back an image at a non- up-converted SD quality from a state that an image is played back at an up-converted HD quality.

As seen from FIGS. 9 and 10, the provision target switch module 601 executes the following procedure after the user instructs a switch of up-convert/non- up-convert. Namely, the module 601 starts to transfer the video data at the segment of neighboring GOP to the other of the CPU/GPU decoding module 602 and the MMP decoding module 603. FIG. 9 shows the case where the user instructs up-convert to perform up-convert playback from a state that playback is performed at non- up-convert SD quality. FIG. 10 shows the case where the user instructs non- up-convert to perform playback at non- up-convert SD quality from a state that playback is performed at up-convert HD quality.

Figure 11:
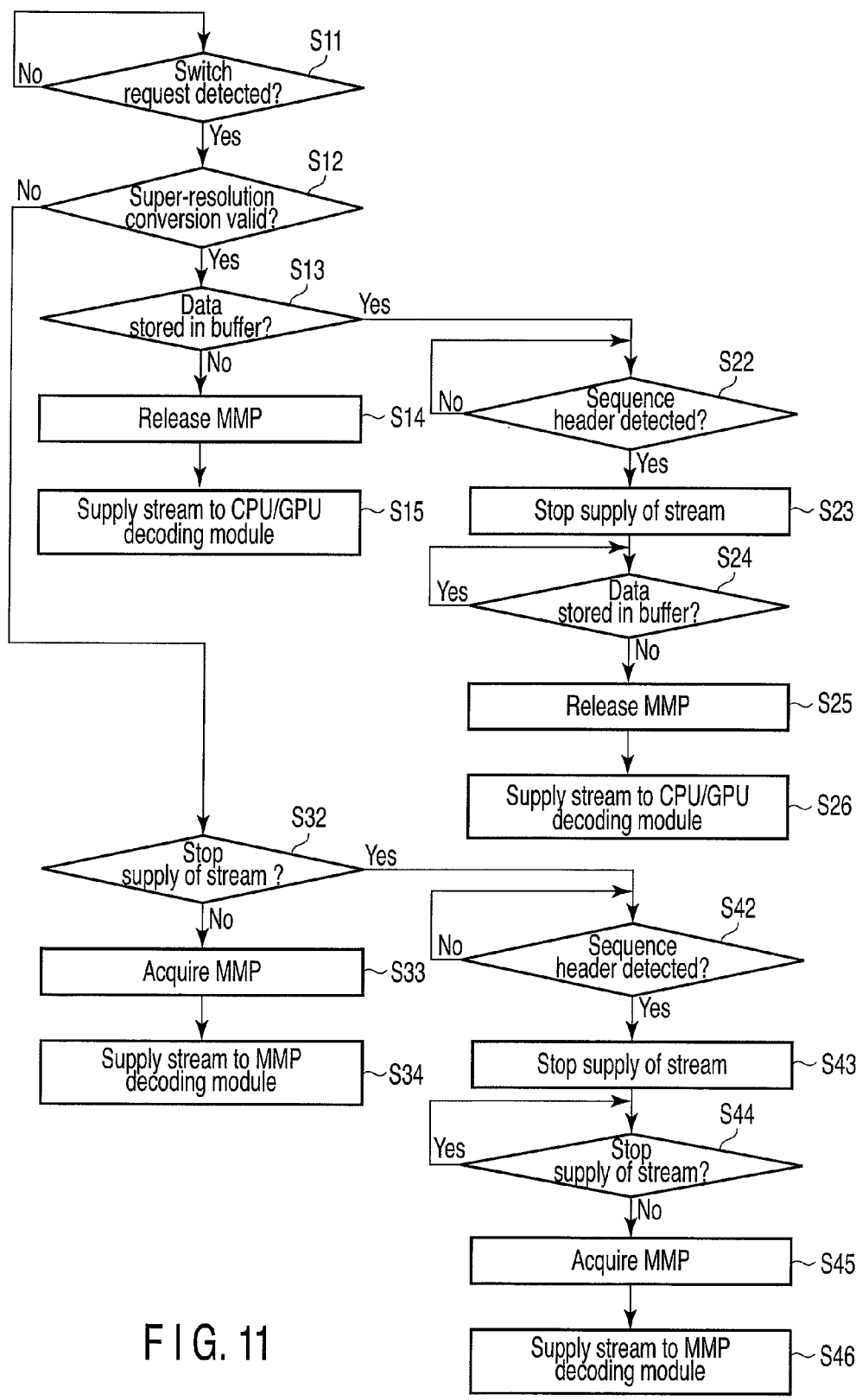
FIG. 11 is an exemplary flowchart to explain the procedure executed by a provision target switch module.

The procedure executed by the provision target switch module 601 will be described below with reference to a flowchart shown in FIG. 11.

The provision target switch module 601 determines whether or not a switch request is received (block S11). If the switch request is received (Yes in block S11), the module 601 determines whether or not super-resolution conversion is valid (block S12). If the module 601 determines that the super-resolution conversion is valid (Yes in block S12), the module 601 determines whether or not data is stored in a stream buffer area 1113 of the memory 113A (block S13).

If the provision target switch module 601 determines that data is not stored in the stream buffer area 1113 (No in block S13), the module 601 gives instructions to release the multimedia processor 113 to the MediaFoundation 531. Then, the MediaFoundation 531 releases the multimedia processor 113 (block S14). After the foregoing release of the multimedia processor, the module 601 supplies a stream of video data to the CPU/GPU decoding module 602 (block S15).

In block S13, if the provision target switch module 601 determines that data is stored in the stream buffer area 1113 (Yes in block S13), the multimedia processor 113 executes decoding and super-resolution conversion. Therefore, the provision target switch module 601 detects a sequence header. If the sequence header is detected (Yes in block S22), the provision target switch module 601 stops the supply of video data stream to the MMP decoding module 603 (block S23). Thereafter, the module 601 determines whether or not data is stored in the stream buffer area 113 of the 113A (block S24). If no data is stored in the stream buffer area 1113 (No in block S24), the module 601 gives instructions to release the multimedia processor 113 to the MediaFoundation 531. Then, the MediaFoundation 531 releases the multimedia processor 113 (block S25). After the foregoing release of the multimedia processor, the module 601 supplies a stream of video data to the CPU/GPU decoding module 602 (block S26).

In block S12, if the module determines that super-resolution conversion is not valid (No in block S12), the module 601 determines whether or not data is stored in a stream buffer area 1103A and a decoding buffer area 1103B of the memory 103 (block S32). If it is determined that data is stored in the stream buffer area 1102A and in the decoding buffer area 1103B (No in block S32), the supply is stopped; for this reason, the provision target switch module 601 gives instructions to acquire the multimedia processor 113 to the MediaFoundation 531. The MediaFoundation 531 acquires the multimedia processor 113 (block S33). The module 601 provides a video data stream to the MMP decoding module (block S34).

In block S32, if it is determined that data is stored in the stream buffer area 1103A and in the decoding buffer area 1103B (No in block S32), playback is performing. Therefore, the provision target switch module 601 detects a sequence header. If the sequence header is detected (Yes in block S42), the module 601 stops the supply of a video data stream to the CPU/GPU decoding module 602 (block S43). Then, the module 601 determines whether or not data is stored in the stream buffer area 1103A and in the decoding buffer area 1103B (block S44). If no data is stored in the stream buffer area 113 (No in block S44), the module 601 gives instructions to acquire the multimedia processor 113 to the MediaFoundation 531. The MediaFoundation 531 acquires the multimedia processor 113 (block S45). After the multimedia processor 113 is acquired, the module 601 supplies a video data stream to the MMP decoding module 603 (block S46).

The foregoing computer 10 has the configuration such that the multimedia processor 113 has a built-in decoding circuit. Therefore, the compressed video data is supplied to the multimedia processor 113, and thereby, it is possible to reduce data transmitted to the multimedia processor 113 compared with the case where decoded video data is supplied to the multimedia processor 113.

In addition, the sequence header is detected, and thereby, a transfer target of the compressed video data is switched. In this way, it is possible to dynamically perform a switch of up-convert/non- up-convert.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A playback apparatus comprising:
a first memory;
a multimedia processor configured to use the first memory as a work memory, and to allocate a first stream buffer area in the first memory, the first stream buffer area configured to store a stream of encoded video data, and the multimedia processor comprising a decoding circuit configured to decode the stream of encoded video data and an arithmetic module configured to execute super-resolution conversion in order to increase the number of pixels of the decoded video data;
an issuing module configured to issue a switching request in order to switch between execution and non-execution of the super-resolution conversion;
a second memory; and
a main processor configured to use the second memory as a work memory, to execute a decoding program application for decoding the stream of encoded video data, and to execute a switching program application configured to switch a destination of the encoded video data where the decoding is executed between the multimedia processor and the decoding program application such that a picture group which is a unit for managing the encoded video data is not divided, in response to the switching request issued from the issuing module, wherein the decoding program application is configured to allocate a second stream buffer area in the second memory for storing a stream of the encoded video data and a decoding buffer area in the second memory for storing data related to decoding, and wherein the switching program application is configured to switch the destination from the multimedia processor to the decoding program application in a state that data is not stored in the stream buffer area of the first memory, and to switch the destination from the decoding program application to the multimedia processor in a state that data is not stored in the stream buffer area and the decode buffer area in the second memory.

2. The apparatus of claim 1, further comprising:
a sub-processor configured to support decoding executed by the main processor.

3. The apparatus of claim 1, wherein the unit for managing the encoded video data is a group of pictures (GOP), and the switching program application is configured to switch the destination at a delimiter of the GOP.

4. The apparatus of claim 3, wherein the switching program application is configured to detect the delimiter of the GOP according to the presence or absence of a sequence header.

5. The apparatus of claim 1, further comprising:
an instruction module configured to instruct to clear the second stream buffer area and the decoding buffer area to the decoding program application or to instruct to clear the first stream buffer area to the multimedia processor when playback of the video data is stopped.

6. A method of controlling a playback apparatus, the playback apparatus comprising:
a multimedia processor configured to use a first memory as a work memory, and to allocate a first stream buffer area in the first memory for storing a stream of encoded video data, and comprising a decoding circuit configured to decode the stream of the encoded video data and an arithmetic module configured to execute a super-resolution conversion to increase the number of pixels of the video data decoded by the decoding circuit; and
a main processor configured to use a second memory as a work memory, to execute a decoding program application configured to decode the stream of the encoded video data, and to allocate a second stream buffer area in the second memory for storing the stream of the encoded video data and a decoding buffer area in the second memory for storing data related to decoding, and configured to execute a switching program application configured to switch a destination of the stream of the encoded video data where the decoding is executed between the multimedia processor and the decoding program application, the method comprising:

supplying, by the switching program application, the stream of the encoded video data to one of the multimedia processor and the decoding program application;

issuing a switching request to switch between execution and non-execution of the super-resolution conversion;

stopping the supply of the stream of the encoded video data to the multimedia processor such that a picture group which is a unit for managing the encoded video data is not divided, when switching a destination of the stream from the multimedia processor to the decoding program application in response to the switching request;

starting the supply of the stream of the video data to the decoding program application in a state that the encoded video data is not stored in the first stream buffer area of the first memory after stopping the supply of the stream of the video data to the multimedia processor;

stopping the supply of the stream of the encoded video data to the decoding program application such that a picture group which is a unit for managing the encoded video data is not divided when switching a destination of the video data from the decoding program application to the multimedia processor in response the switch request; and starting the supply of the stream of the encoded video data to the multimedia processor in a state that data is not stored in the second stream buffer area of the second memory and the decoding buffer area after stopping the supply of the stream of the video data to the decoding program application.

7. The method of claim 6, wherein the playback apparatus further comprises a sub-processor configured to support decoding executed by the decoding program application.

8. The method of claim 6, wherein the picture group that is the unit for managing the encoded video data is GOP (group of pictures), and the supplying of the stream of the encoded video data is stopped at a delimiter of the GOP.

9. The method of claim 8, wherein the delimiter of the GOP is detected according to the presence or absence of a sequence header.

10. The method of claim 6, further comprising instructing the decoding program application to clear the second stream buffer area and the decoding buffer area, or instructing the multimedia processor to clear the first stream buffer area, when playback of the video data is stopped.

\* \* \* \* \*